US012319230B2

(12) United States Patent
Guenther et al.

(10) Patent No.: US 12,319,230 B2
(45) Date of Patent: Jun. 3, 2025

(54) PREVENTING A MOVEMENT OF AN AUTONOMOUS VEHICLE

(71) Applicant: Daimler Truck AG, Leinfelden-Echterdingen (DE)

(72) Inventors: Janine Guenther, Leinfelden-Echterdingen (DE); Nicolai Spohrer, Stuttgart (DE); Lucas Volkert, Tiefenbronn (DE); Florian Flerlage, Stuttgart (DE)

(73) Assignee: Daimler Truck AG, Leinfelden-Echterdingen (DE)

( * ) Notice: Subject to any disclaimer, the term of this patent is extended or adjusted under 35 U.S.C. 154(b) by 226 days.

(21) Appl. No.: 18/006,442

(22) PCT Filed: Jun. 28, 2021

(86) PCT No.: PCT/EP2021/067660
§ 371 (c)(1),
(2) Date: Jan. 23, 2023

(87) PCT Pub. No.: WO2022/017731
PCT Pub. Date: Jan. 27, 2022

(65) Prior Publication Data
US 2023/0264652 A1 Aug. 24, 2023

(30) Foreign Application Priority Data
Jul. 24, 2020 (DE) ..................... 10 2020 004 483.2

(51) Int. Cl.
*B60R 25/24* (2013.01)
*B60R 25/00* (2013.01)
*B60W 60/00* (2020.01)

(52) U.S. Cl.
CPC ............ *B60R 25/24* (2013.01); *B60R 25/003* (2013.01); *B60W 60/001* (2020.02)

(58) Field of Classification Search
CPC .......... B60R 2025/0405; B60R 25/003; B60R 25/20; B60R 25/24; B60W 2556/45;
(Continued)

(56) References Cited

U.S. PATENT DOCUMENTS 8,104,823 B2 * 1/2012 Kohlstrand ........... E05C 17/003
296/146.1
8,330,575 B2 * 12/2012 Vincent ................... B60R 25/24
340/5.1
(Continued)

FOREIGN PATENT DOCUMENTS

AU 2011213807 A1 9/2011
DE 195 39 852 C1 10/1996
(Continued)

OTHER PUBLICATIONS

PCT/EP2021/067660, International Search Report dated Oct. 28, 2021 (Two (2) pages).
(Continued)

Primary Examiner — Tyler J Lee
(74) Attorney, Agent, or Firm — Crowell & Moring LLP

(57) ABSTRACT

A device for preventing a movement of an at least partially autonomously drivable vehicle in an autonomous driving mode includes an actuator where an immobilization function of the at least partially autonomously drivable vehicle is activatable or deactivatable by the actuator. The actuator is a switch accessible from outside of the at least partially autonomously drivable vehicle. Access to the actuator is controllable by an overriding safety device.

11 Claims, 2 Drawing Sheets

(58) Field of Classification Search
CPC ......... B60W 30/18054; B60W 50/082; B60W 60/00; B60W 60/001
See application file for complete search history.

(56) References Cited

U.S. PATENT DOCUMENTS

| | | | | |
|---|---|---|---|---|
| 8,845,037 | B2* | 9/2014 | Risse | B60T 17/18 303/123 |
| 10,562,526 | B2 | 2/2020 | Yako et al. | |
| 11,396,279 | B2 | 7/2022 | Heller et al. | |
| 2001/0050509 | A1* | 12/2001 | Holt | B60R 25/08 303/89 |
| 2005/0062344 | A1* | 3/2005 | Holt | E05B 83/02 303/7 |
| 2008/0309120 | A1* | 12/2008 | Kohlstrand | E05F 5/00 296/146.11 |
| 2020/0118361 | A1* | 4/2020 | Zula | G01M 17/007 |
| 2020/0233410 | A1* | 7/2020 | Burns | B60L 50/66 |
| 2020/0293034 | A1 | 9/2020 | Shibata et al. | |
| 2021/0070270 | A1* | 3/2021 | Glouchkoff | B60T 7/20 |
| 2021/0276522 | A1* | 9/2021 | Harrison | B60T 13/265 |

FOREIGN PATENT DOCUMENTS

| | | |
|---|---|---|
| DE | 101 46 770 A1 | 4/2003 |
| DE | 10 2016 116 861 A1 | 3/2018 |
| DE | 10 2016 014 864 A1 | 6/2018 |
| DE | 10 2017 126 513 A1 | 5/2019 |
| DE | 10 2018 131 642 A1 | 6/2019 |
| DE | 10 2018 113 823 A1 | 12/2019 |
| DE | 10 2018 209 989 A1 | 12/2019 |
| DE | 10 2018 217 653 A1 | 4/2020 |
| DE | 10 2020 103 032 A1 | 9/2020 |
| DE | 10 2020 004 987 A1 | 10/2020 |
| EP | 3 090 912 A1 | 11/2016 |
| EP | 3 318 050 B1 | 5/2018 |

OTHER PUBLICATIONS

German-language German Office Action issued in German application No. 10 2020 004 483.2 dated Feb. 3, 2021 (Five (5) pages).

* cited by examiner

PREVENTING A MOVEMENT OF AN AUTONOMOUS VEHICLE

BACKGROUND AND SUMMARY OF THE INVENTION

The invention relates to a device for preventing a movement of an at least partially autonomously drivable vehicle in an autonomous driving mode. The invention also relates to a method for preventing a movement of an at least partially autonomously drivable vehicle in an autonomous driving mode, having such a device.

Even in the near future, autonomously driving vehicles and in particular also autonomously driving lorries will be travelling on more and more roads. It will especially be the case with autonomously driving lorries that these will typically be configured in the form of an autonomously driving towing vehicle, to which any number of semitrailers or trailers will be able to be coupled. The coupling of these carriages then occurs in so-called hubs or in depots, which are typically privately operated and are correspondingly secured, so that inside the hub, which can, for example, be located on a motorway, access to the self-driving towing vehicles and respectively the carriages is only given to a predefined group of people.

The overall plan thereby provides that so-called Level 4 journeys from such a hub are operationally supervised in the autonomous driving mode. So all journeys of the self-driving vehicles start and end at these hubs. The coordination of the self-driving vehicle, its loading, its coupling and decoupling from semitrailers or trailers and also the maintenance and inspection of the self-driving vehicles occur inside the hub. It is also expected that the hubs handle all the logistics of the transfer of the semitrailers and trailers between the hub and the distribution centers for customers.

In the case of a technical defect in a self-driving vehicle, for example a self-driving lorry, it is then the case that the hub and a control center correspondingly coordinate for managing the self-driving lorry outside the hub in order to ensure a collection and repair of the self-driving vehicle. Each hub thereby secures the necessary infrastructure for maintenance, inspection, cleaning, refuelling, routine repairs, but also for weighing and calibrating the vehicles, in order to keep the self-driving vehicles running. To support the maintenance of the fleet of self-driving vehicles, there is an extensive IT infrastructure.

Both inside as well as outside these hubs, situations arise during use of self-driving vehicles, in which the at least partially autonomously driving vehicle must interact with people in an autonomous driving mode. Examples can be maintenance and repairs are necessary or, for example, border checks or similar.

It is thus the case that autonomous Level 4 vehicles are technically designed so that they can carry out journeys inside a certain domain, the so-called ODD (Operation Design Domain). For hub applications, the assumption is made in the initial phase that the operational area will primarily be on motorways, highways or similar. This has the result that the technical realization of the autonomous driving functions can initially only cope with the circumstances that arise in this ODD. A safe interaction between people and the autonomously driving vehicle in such a situation can therefore still not be completely guaranteed. In particular for maintenance, repair and inspection work, a stationary status of the vehicle must, however, be ensured. An inaccurate detection of a situation by the vehicle could indeed lead to a vehicle movement, although, for example, a mechanic is occupied working on or under the vehicle. Serious accidents as a result of such a malfunction of the self-driving vehicle must be avoided. This applies, in principle, for all types of vehicles, but represents an especial challenge for self-driving lorries, since these can cause especially serious damage in the case of a potential accident, due to their size and their weight.

It is also the case in the practice of current vehicles that an actuator for activating or deactivating an immobilization function is typically provided for the vehicle. For example, a handbrake or parking brake of the vehicle can be tightened by means of a switch or, in older vehicles, also purely mechanically. The vehicle can then not move, or not move readily. For autonomously driving vehicle or partially autonomously driving vehicles in autonomous driving mode it is, however, possible that the parking brake is relaxed due to an incident in the surroundings recognised by the sensors of the vehicle. When the vehicle is controlled via a vehicle-external server, for example via a control center, which coordinates the movement of the vehicles inside the hub or also outside the hub, a relaxing of the parking brake and a corresponding movement of the vehicle can also be initiated by means of a corresponding control from this control center, if possible without the control center being aware of the current maintenance of the vehicle, or if possible also if this leads to a corresponding malfunction in the control center. This is extremely dangerous and always carries the risk of accidents, in particular serious accidents with bodily injuries, since in this situation people are typically, for example, occupied with the maintenance of the vehicle and/or an inspection of the vehicle.

A system and a method for switching between an autonomous and a manual driving mode in a vehicle is known from the further general prior art, in the form of AU 2011 213 807 A1. It is the case here that the manual driving mode has priority in every case, so that autonomous driving manoeuvres can be suppressed at any time by a manual operation of the vehicle by a person driving or controlling the latter.

For the further general prior art, an electronic key is also known from DE 195 39 852 C1, which enters into contact with the vehicle by means of a corresponding communication channel, wherein this communication can be blocked or locked with the key if necessary.

A system for driverless operation of a commercial vehicle in a restricted area is disclosed by DE 10 2016 116 861 A1. The commercial vehicle enables an autonomous operating mode and comprises an electro-pneumatic parking brake system which is designed in order to release the parking brake system when there is a valid autonomous control signal and to initiate an automatic emergency braking, if there is no valid autonomous control signal. The system comprises a control module and a transfer module. The control module is configured to output the valid autonomous control signal to the electro-pneumatic parking braking system and to driverlessly control the commercial vehicle. The transfer module is configured to transmit a control of the commercial vehicle from the driver to the control module.

DE 101 46 770 A1 relates to a brake system for a driverlessly operable vehicle. This has a service brake device, a parking brake device and an emergency brake device. At least the wheel brake devices of the wheels of one axle of the vehicle include emergency brake actuators, which switch the associated wheel brake devices into the braking state by means of the initiation of an emergency braking process. The emergency braking process can be initiated both manually by means of an emergency brake operating device and also independently, by means of a monitoring device, if this has detected an improper operating state of the vehicle in the driverless operation.

The object of the present invention consists of specifying a device for providing prevention of a movement of an at least partially autonomously drivable vehicle in an autonomous driving mode, which can safely and reliably prevent a movement of the vehicle.

For the device according to the invention it is now that case that with at least one actuator, which is formed as a switch accessible from outside the vehicle, an immobilization function can be activated or deactivated. An overriding safety device for controlling the access to the actuator and/or its operation is here provided according to the invention. It is thereby ensured that the immobilization function, for example switching off driving functions and/or engaging a parking brake, is secured by means of the overriding safety device. An operation of the actuator, which can also be referred to as the motion blockage switch (MBS), can only occur and the state of the immobilization function can only be changed if the overriding safety device is disengaged. This ensures that the immobilization function can only be activated and in particular deactivated by a person on location. In the case of a misidentification by the sensors or an externally-originating drive command, the overriding safety device then also guarantees that the immobilization function remains in the state specified by the actuator, until access to the actuator has been unblocked by means of the overriding safety device, so that this can be switched. Here, the safety device itself is formed so that, by means of this, only an authorized group of people has access to the actuator.

In the first solution variant of the device according to the invention, the safety device can comprise at least one mechanical lock that is operable with a key in order to control the access to the actuator for this. This design is, in principle, comparable with the lockable flap, which is standard in passenger buses, in order to close or to open the doors of the bus in a way that is secured from outside the bus. A comparable flap can also be provided in the autonomously driving vehicle. For example, the maintenance staff in the hub can then open this flap with a key, in order to correspondingly operate the actuator, for example in order to activate the immobilization function and to thus ensure that the vehicle does not move under any circumstance. Subsequently, the flap is closed and remains locked during the whole maintenance period, so that no accidental operation of the actuator can occur, which could lead to a corresponding accident. By means of the overriding safety device it is here also ensured that an unauthorized person, who indeed does not have a compatible key in the exemplary embodiment shown here, cannot immobilize the autonomously driving vehicle, for example in a traffic jam.

In the second solution variant of the device according to the invention it can also be provided that the safety device comprises at least one electronic communication unit for communicating with an electric identification provider, which is configured to control access, dependent on an authorization for the respective identification provider. In place of the mechanical key from the preceding embodiment variants, there can also be electronic security, for example by means of an electronic key. This can be wirelessly implemented, similarly to a so-called Keyless Go key in current vehicles. Alternative possibilities are also conceivable, for example the use of a portable terminal, such as, for example, a smart phone, as the identification provider for the communication unit. Further embodiments like, for example, a touchpad via which numbers, fingerprints, faces, the iris, the eyes or similar can be recognised in order to make the corresponding identification provider recognisable to the communication unit, are also of course conceivable.

In the simplest variants of this it is here provided according to an advantageous development of the device that the authorization of the respective identification provider is stored in the communication unit of the vehicle. Here, those identification providers that have authorized access to the actuator are therefore saved in order to, for example, share a suitable transmitter with the maintenance personnel in a hub, as a key which enables the opening and closing, for example of the flap or also the electronic operation of the switch, after gaining access by means of the overriding safety device.

An alternative to this can provide that the communication device is configured to request the authorization of the respective identification provider from a vehicle-external server. Instead of storing authorization in the communication unit of the vehicle, these authorizations can, then, therefore alternatively or additionally be stored in a vehicle-external server. This has the decided advantage that a simple and efficient alteration of the corresponding authorizations is possible. Therefore, very simple temporary authorizations can be granted by means of the vehicle-external server, which is, for example, coupled with a vehicle control center or the control center of the hub, or is configured by this, for example if external service providers are active at the hub in order to clean vehicles, to service vehicles, or similar. In this case, temporary authorizations can generally be given to certain people or subcontractors for a certain period of time and/or certain vehicles and/or certain places, by means of the vehicle-external server. In particular, this function also represents a considerable advantage when it is necessary to immobilize the vehicle outside a hub. In the case of, for example, a breakdown, the maintenance staff coming to the vehicle can therefore request a temporary authorization from the vehicle-external server and this can be granted, for example in order to investigate the cause of the vehicle breaking down, to re-couple the semitrailer to the replacement towing vehicle, or similar. Official checks, for example customs checks, can also be safely carried out in this way, in that the customs officials request temporary authorization from the vehicle-external server and this correspondingly grants them this, if necessary after checking the identity of the people or organisations.

Both solution variants can therefore also be combined with each other, so used together.

As already mentioned, the actuator is fitted as a vehicle-external switch on the outside area of the vehicle. It can be mechanically operable and/or directly or also indirectly operable by means of an electronic command. The mechanical operation is, for example, flipping an actual mechanical switch, which then transmits the corresponding electronic signals to the necessary actuators for controlling the immobilization function. Alternatively to this, the switching can also occur exclusively by means of electronic commands, for example by means of an app on a smart phone, a touchscreen in the area of the vehicle or indirectly in that, for example, the transmission of a corresponding command from the vehicle-external server to the vehicle is requested by means of an app.

As also already mentioned, the immobilization function when activated can comprise at least one locking of the brakes, in order to, if necessary, also mechanically lock the vehicle in addition to a corresponding electronic blocking of the driving mode, just in case.

The method according to the invention for preventing a movement of an at least partially autonomously drivable vehicle in an autonomous driving mode, having such a device accordingly provides that the immobilization function can only be switched by means of the actuator after access to the actuator is approved by means of the overriding safety device. The overriding safety function therefore always has priority over all other switch movements, be it external driving commands, driving commands due to an interpretation of the surrounding conditions by a sensor, or similar. Only if the immobilization function is deactivated by means of the actuator after access to this has been approved by means of the safety device can these commands then be correspondingly implemented. As long as the immobilization function is activated, this is correspondingly prevented, whether electronically or mechanically, by the application of the parking brakes, as has already been described above.

In a very advantageous development of the method according to the invention with a device where the communication unit is configured to request the authorization of the respective identification provider from a vehicle-external server, it is now the case that permanent and temporary authorizations are stored in the vehicle-external server. This enables the advantages already described above, especially, for example, for temporary work involving the vehicle in or outside a hub, for example for a border check of the load, to temporarily offer access to the actuator and thus to create the opportunity to activate the immobilization function during border checks, so that the border officials carrying out the checks are safe.

A further very advantageous embodiment of this variant of the method according to the invention here provides that the vehicle-external sever comprises means for communicating with and for identifying people, in order to grant a clearly identified person or group of people temporary access. The possibility is hereby created that this person can be identified, for example, by means of an established method for the identification of people, be it, for example, over an app, by means of a video chat or similar. They can, for example, identify themselves by means of an electronic identification document and allow an operator of the vehicle-external server to, for example, compare a feature recorded in this electronic identification document, for example a fingerprint or a face with a current feature transmitted via a camera or similar. People can hereby be correspondingly identified. If the identification is successful and if the person is in principle authorized, then, for example, a temporary authorization can be granted after such an identification. This can, for example, be useful for maintenance work or emergency operations in the case of a breakdown of the vehicle outside the hub, but also, for example, in the case of checks by customs officials, as already mentioned several times.

Further advantageous embodiments of the device according to the invention as well as the method according to the invention arise from the exemplary embodiments, which are described in more detail in the following with reference to the figures.

DETAILED DESCRIPTION OF THE DRAWINGS

Figure 1:
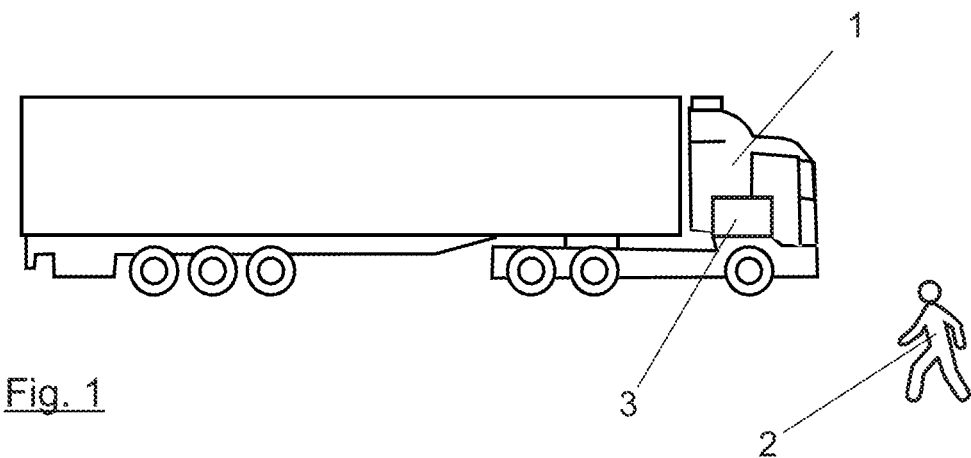
FIG. 1 shows an exemplary autonomously driving vehicle and a person approaching this.

In the illustration of FIG. 1, an autonomously driving vehicle 1 is shown, using the example of a carriage from a towing vehicle and a semitrailer. The vehicle 1 could just as easily be a lorry with or without a trailer, a bus, a passenger car or similar. The autonomously driving vehicle 1, which, as it is shown here in the exemplary embodiment, is also referred to as a SDT (Self Driving Truck), should therefore be formed as a Level 4 vehicle, which transports the semitrailer of the carriage along a motorway or a highway between hubs by means of the autonomously driving towing vehicle. The controlling for this thereby occurs through a so-called vehicle control center, which serves as the backend for the SDTs 1 between two hubs. Inside the hub, the controlling similarly occurs through a so-called hub control center as the backend for the internal operations inside the hub. In order to ensure that the SDT 1 cannot move and thereby, for example, injure a person working underneath the SDT 1 for potential maintenance, cleaning and/or inspection work, the SDT 1, or every other comparable autonomously driving vehicle 1, is equipped with an actuator to activate or deactivate an immobilization function for the vehicle 1. If, for example, a person 2 approaches the vehicle as indicated in the scenario of FIG. 1, then this person 2 should be able to activate an immobilization function for the vehicle 1 if they want to carry out maintenance work on the vehicle 1, in order to ensure that the vehicle 1 does not start and move due to a command from a control center and/or a sensor-related miscalculation, whereby the person 2 could be injured, for example if they are working on the wheels or underneath the vehicle.

Figure 2:
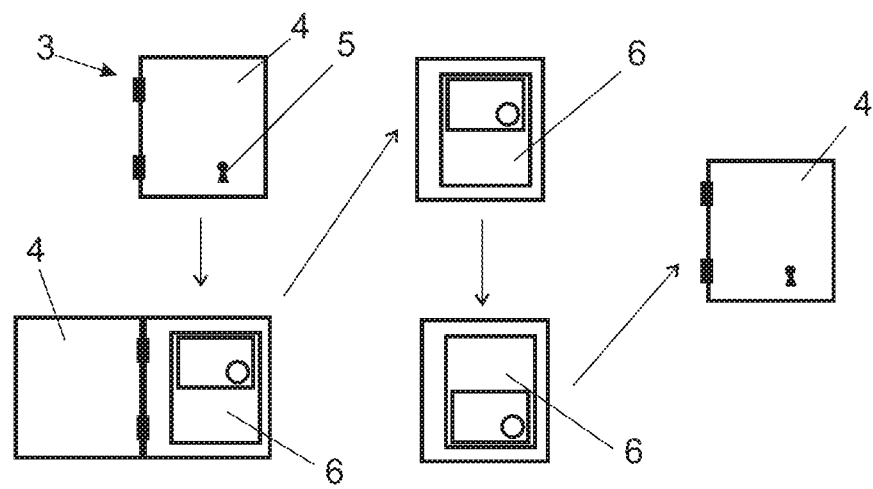
FIG. 2 is a schematic illustration of a safety device for an actuator for activating and deactivating an immobilization function in a first possible embodiment.

However, it should now be ensured that not just any person can immobilize an autonomously driving vehicle 1 that is, for example, stuck in a traffic jam, by means of such an actuator. For this reason, a safety device 3 as shown in FIG. 2 in a possible embodiment is provided. In the exemplary embodiment of FIG. 2, this consists of a flap 4 indicated in the exterior of the vehicle 1, which should include a mechanical lock 5, which is here shown as a keyhole and should symbolise a mechanical lock. The flap 4 of the safety device 3 can only then be opened by the person 2 if they have a key that fits it with them. They can then, as is shown in the bottom left of FIG. 2, correspondingly open the flap and switch an actuator 6 situated in it, for example a mechanical switch, by means of which the immobilization function can be directly or indirectly activated or deactivated. This is correspondingly shown in the illustration of FIG. 2, in the middle. In order to correspondingly secure the state they have set, for example the activation of the immobilization function for the vehicle 1 at the beginning of maintenance work, they subsequently re-close the flap 4 of the safety device 3 and mechanically lock this with the key, as is shown on the far right of the illustration of FIG. 2. It is therefore ensured that no other person, who does not have the necessary key, can open the flap 4 and change the state of the actuator 6.

Figure 3:
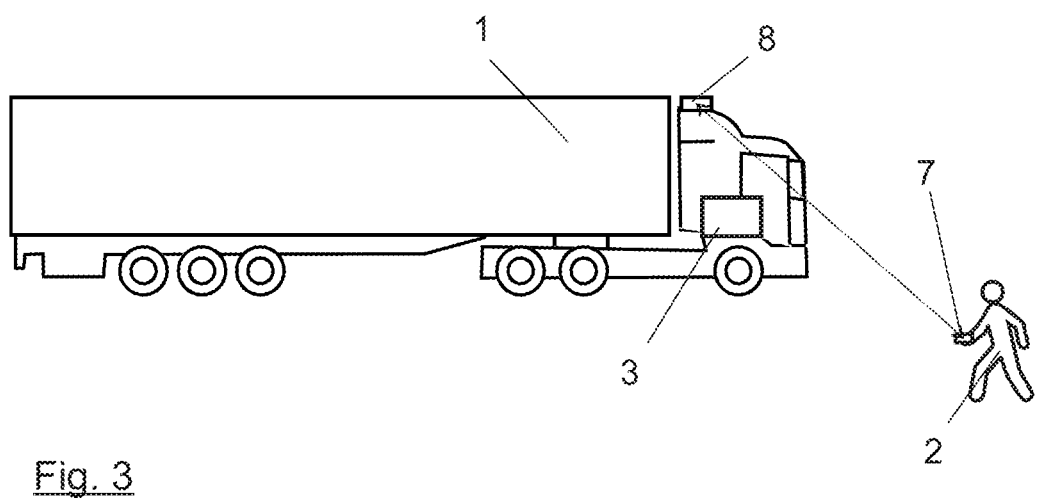
FIG. 3 shows a scenario comparable to that in FIG. 1, with communication between an electronic identification provider of the person and of the vehicle.
Figure 4:
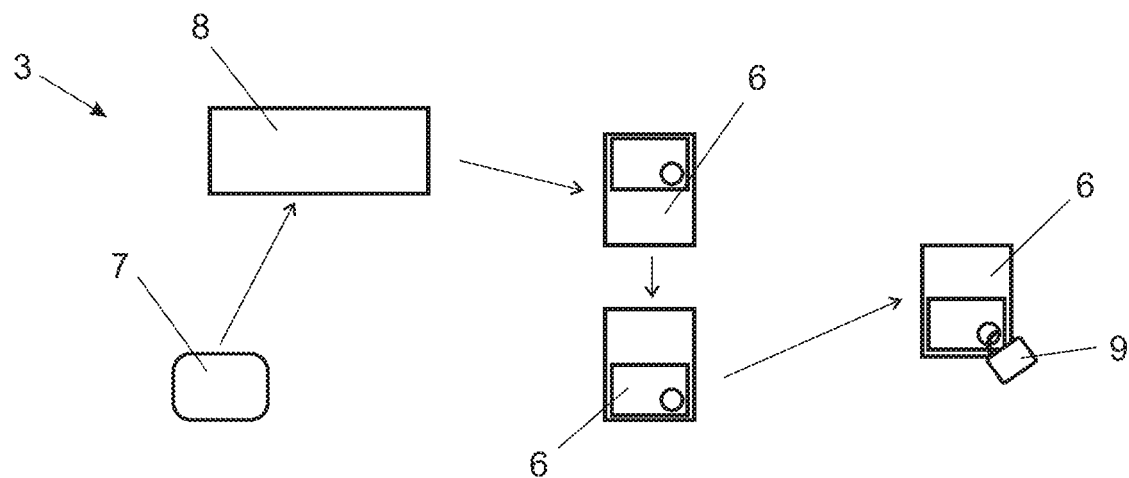
FIG. 4 is an illustration similar to that in FIG. 2, for the scenario according to FIG. 3.

In the illustrations of FIGS. 3 and 4, a comparable scenario to that in the illustrations of FIGS. 1 and 2 is shown again. In place of the very simple mechanical key there are other keys, which can typically be summarised under the term electronic keys. For this, the person 2 has an identification provider 7 with them, which can be formed as a separate device, for example in the manner of a Keyless Go key, or which can also be made in any other way, for example by means of a smart phone. This electronic key sends a signal, for example a wireless signal, e.g., via Bluetooth, an NFC signal or another kind of electronic communication to a communication unit 8 of the vehicle 1, which serves as a receiver. Access to the flap 4 is, for example, thereby unlocked and can also be re-locked by means of a corresponding signal from the identification provider 7, for example the pressing of a locking button.

In place of the flap 4, a completely electronic safety device 3 can also occur, as is correspondingly suggested in the illustration of FIG. 4. The identification provider 7 sends a signal to the communication device 8 acting as a receiver, which accordingly unlocks access and, for example, ensures the switching of the actuator 6 from its activated into the deactivated state for the immobilization function after the unlocking is done, by means of a further electronic signal from the identification provider 7. This state can subsequently be electronically locked, as is indicated on the right of the illustration of FIG. 4 by means of a symbol of a padlock 9. In order to switch the actuator 6 back into the other position, the same process would be necessary, beginning with the identification of the identification provider 7, checking its authorization, for example in the communication device 8, the release of the electronic lock 9, so securing the state of the actuator 6, and a subsequent switching of the same with a renewed securing of the state into which the actuator 6 has then been switched.

Figure 5:
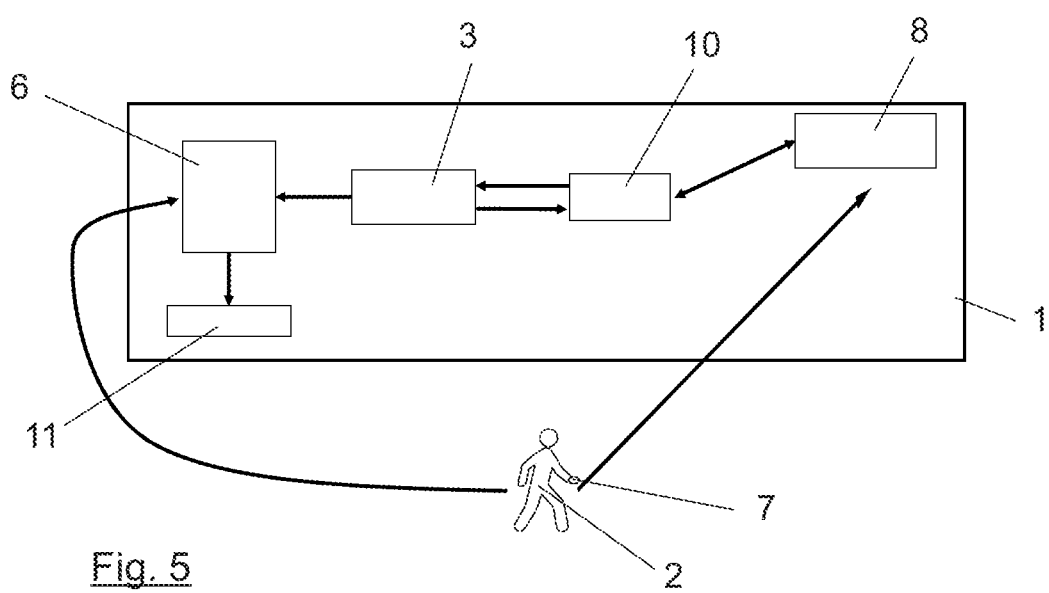
FIG. 5 shows a possible implementation of the concept according to FIG. 3 and FIG. 4.
Figure 6:
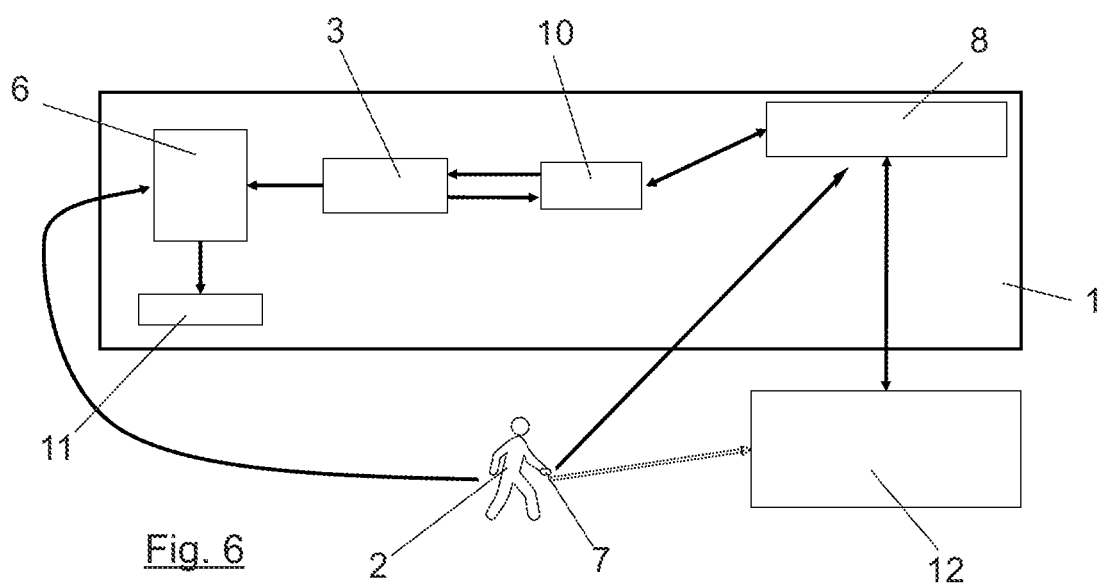
FIG. 6 shows a possible implementation similar to that in FIG. 5, in an alternative variation of the embodiment.

A possible technical implementation of the procedure could here appear as it is shown in the illustration of FIG. 5. The person 2 operates their identification provider 7, for example on the smart phone, a remote key or similar. The communication device 8 of the vehicle 1 receives the corresponding signal and transmits the data to a control unit 10, which can be part of the communication device 8. In the communication device 8 and/or the control unit 10, the corresponding authorizations for different identification providers 7 or at least one identification provider 7 are then correspondingly stored. If the signal of the identification provider 7 of the person corresponds to the one identification provider 7 for which a corresponding authorization is stored, then the safety device 3 is released, otherwise it remains locked. If it is released, the control unit 10 gives a corresponding signal to the overriding safety device 3, which releases the actuator 6, so that the person 2 can switch this directly or indirectly, for example by means of their smart phone. If the immobilization function is activated, a corresponding signal can be transmitted to a parking brake of the vehicle 1 (labelled with 11), which then switches into the braked position and so safely and reliably mechanically prevents the vehicle 1 moving, regardless of whether the vehicle 1 wants to move due to a misjudgment of a sensor, for example if the person 2 is in the blind spot of the sensor system or due to an external drive command, for example from a control center of the hub or the infrastructure between the hubs. In order to deactivate the actuator 6 again and permit a movement of the vehicle, the person 2 must again identify themselves to the communication device 8 of the vehicle 1 and can then, if a corresponding authorization for their identification provider 7 is stored, switch the actuator 6 again, in the same way as described above.

In the illustration of FIG. 5, an alternative variant of the technical implementation is shown, which is set up on an additional vehicle-external server 12. The communication between the identification provider 7 of the person 2 and the communication device 8 in the vehicle 1 can now, for example, occur via this vehicle-external server or also directly with the communication device 8, which then correspondingly engages the vehicle-external server 12. It is the case here that the authorization for the identification provider 7 and thus the person 2 is saved as a permanent or temporary authorization in the vehicle-external server 12, so that the communication device 8 offers the possibility for the person 2 to operate the actuator 6 after a successful positive granting of the authorization, in the same way as already described above. The engagement of the vehicle-external server 12 has the advantage that an adjustment and updating of the corresponding authorizations can occur extremely simply and efficiently, without the respective vehicle 1 having to be directly accessed. It is thereby, for example, possible to provide frequently-changing staff in the hubs, who are, for example, responsible for cleaning work, with the corresponding authorization and also to delete this again, if the people are no longer working in the hub.

It is therefore also conceivable to temporarily allow individual external people, such as, for example, customs officials, temporary access to the actuator 6 by means of an authorization process, for example by means of a telephone or app or video-based authorization process, in order to, for example, be able to prevent an unwanted movement of the vehicle 1 during customs checks of the load.

The invention claimed is:

1. A device for preventing a movement of an at least partially autonomously drivable vehicle (1) in an autonomous driving mode, comprising:
    an actuator (6), wherein an immobilization function of the at least partially autonomously drivable vehicle (1) is activatable or deactivatable by the actuator (6); and
    an overriding safety device (3), wherein the actuator (6) is disposed within the overriding safety device (3) and wherein access to the actuator (6) is controllable by the overriding safety device (3);
    wherein the actuator (6) is a switch accessible from outside of the at least partially autonomously drivable vehicle;
    wherein the overriding safety device (3) comprises a flap (4) which includes a mechanical lock (5) and wherein the flap (4) is openable by unlocking the mechanical lock (5) with a key to provide access to the actuator (6).

2. A device for preventing a movement of an at least partially autonomously drivable vehicle (1) in an autonomous driving mode, comprising:
    an actuator (6), wherein an immobilization function of the at least partially autonomously drivable vehicle (1) is activatable or deactivatable by the actuator (6); and
    an overriding safety device (3), wherein the overriding safety device (3) is a completely electronic safety device (3) and wherein operation of the actuator (6) is controllable by the overriding safety device (3);
    wherein the actuator (6) is a switch accessible from outside of the at least partially autonomously drivable vehicle;
    wherein the overriding safety device (3) comprises an electronic communication device (8), wherein the electronic communication device (8) communicates with an electronic identification provider (7) which is configured to control operation of the actuator (6) dependent on an authorization for the electronic identification provider (7).

3. The device according to claim 1, wherein the actuator (6) is mechanically operable and/or is directly or indirectly operable by an electronic command.

4. The device according to claim 1, wherein the immobilization function comprises a locking of a brake (11) of the vehicle (1).

5. The device according to claim 2, wherein the authorization is stored in the electronic communication device (8).

6. The device according to claim 2, wherein the electronic communication device (8) is configured to request the authorization of the electronic identification provider (7) from a vehicle-external server (12).

7. The device according to claim 2, wherein the actuator (6) is mechanically operable and/or is directly or indirectly operable by an electronic command.

8. The device according to claim 2, wherein the immobilization function comprises a locking of a brake (11) of the vehicle (1).

9. A method for preventing a movement of an at least partially autonomously drivable vehicle (1) in an autonomous driving mode by a device, the device comprising:

an actuator (6), wherein an immobilization function of the at least partially autonomously drivable vehicle (1) is activatable or deactivatable by the actuator (6); and an overriding safety device (3), wherein access to the actuator (6) is controllable by the overriding safety device (3);

wherein the actuator (6) is a switch accessible from outside of the at least partially autonomously drivable vehicle;

and comprising the steps of:

approving access to the actuator (6) by the overriding safety device (3); and activating or deactivating the immobilization function by the actuator only after the approving.

10. The method according to claim 9, further comprising the step of storing a permanent and a temporary authorization for an electronic identification provider (7) on a vehicle-external server (12).

11. The method according to claim 10, wherein the vehicle-external server (12) is configured to communicate with a person and identify the person and to grant a temporary authorization to the person.

* * * * *